Patented Jan. 6, 1942

2,268,593

UNITED STATES PATENT OFFICE 2,268,593

QUICK-SETTING PRINTING INK

Walter Huber, Locust, N. J., assignor to J. M. Huber, Inc., New York, N. Y., a corporation of New Jersey No Drawing. Application August 30, 1937, Serial No. 161,579

11 Claims. (Cl. 106—28)

The present invention relates to new printing ink compositions adapted for use in practicing a new method of commercial printing by which is obtained a new printing effect. The products of the invention are particularly effective for large volume high speed printing, by gravure, letterpress, or offset, of containers, publications and literature of all sorts.

It is an object of the invention to provide printing inks of the "quick-drying" type of unusual composition, more efficient and more flexible in their adaptation than those at present known and of sufficient penetrating power to fix the ink to the stock on which it is printed yet acting to set rapidly on the surface of the stock so as to form clear and sharp imprints in the form of thin, non-tacky films which become set immediately when printed. Further objects of my invention are to provide new printing processes and new printed products which make use of inks such as those set forth herein, but all rights to claim such processes and such products are reserved for other applications. In printing with the inks of the present invention, new printing effects can be realized.

It is well known in the art that commercial printing inks are printed at normal temperatures, after which they are dried in one or more of the following ways: By oxidation and/or by polymerization of the oily constituents of the vehicle, by evaporation of the solvent or carrier, by penetration and absorption within the interstices of the paper. These drying properties are sometimes accelerated by the application of heat after printing.

Gravure inks and the new quick-drying letterpress inks, at present in use, rely on evaporation of the solvent or carrier. This evaporation is usually hastened by the application of heat after printing. Gravure inks consist of pigment, resinous binder, and volatile solvents, such as xylol, toluol, and benzol, and diluents, such as naphthas. They are highly inflammable and have a tendency to settle out on standing. They must be thinned with additional solvent to adjust drying speed and consistency for printing, resulting in extra work and non-uniformity. The use of cheap diluents frequently causes mottling of solids and loss of detail in fine prints. The expelled solvents are detrimental to health and present a dangerous fire hazard. Since only approximately 50% of the ink deposited on the paper remains there after the volatiles have been expelled, these inks are necessarily low in pigment and binder concentration. The non-lubricating qualities of the solvents cause excessive wear of printing surfaces and doctor blades.

The quick-drying letterpress inks also consist of pigment, binder, and solvent, but the solvents in these inks possess high boiling points. These inks, therefore, require the application of considerable heat after printing to evaporate the solvents sufficiently rapidly to produce a dry print.

News inks consist of pigment dispersed in non-drying mineral oils, sometimes bodied with resins or vegetable oils. They penetrate into the interstices of porous news stock by capillary attraction, thereby fixing the pigment onto the fibres. Because these inks never actually become solid, they have a tendency to smear. The side of the paper first printed is, therefore, always marred by the printing of the reverse side, and "first impression" printing is recognized as inferior to "second impression" printing, and is a constant source of trouble to printers. Both sides are subject to marring in passing over angle bars and folders, and are apt to soil hands and clothes of readers. For high speed presses these inks must be thin in consistency and, therefore, sometimes have a tendency to settle. This invention further has the object of producing an ink that resists transfer or offset under moderate heat and pressure and consequently "first impression" is not marred by the printing of the reverse side as above indicated.

Present commercial inks for all uses except those described above are often first fixed by penetration but ultimately dry by oxidation and/or polymerization of the vehicle. These inks consist of pigment dispersed in polymerized drying oils, such as linseed or China-wood oil, with addition of metallic soaps to facilitate drying. The drying speed of these inks must be delicately adjusted so that they will not dry on the press, but as soon thereafter as possible. In multicolor printing, where one ink is superimposed on the other, the first ink must still possess tack when the second color is applied, as an ink will not trap on a "bone dry" print. Since climatic changes in the pressroom affect the speed of oxidation, adjustments in the ink must frequently be made in the pressroom to obtain the required drying speed. Prints made with these inks must be handled with extreme care to prevent spoilage until the oxidation is complete. Because of their chemical activity, these inks stiffen with age, react with pigments causing hardening or livering, and form skin in containers and press fountains. Presses must, therefore, be cleaned when not in use.

The consistency of all such inks must be adjusted by formula to meet the requirements of the type and speed of press, the medium to be printed on, and their ultimate use.

The ink of the present invention does not dry by oxidation or polymerization, evaporation, or absorption, and it eliminates the disadvantages of the previously described inks. Instead of using an ink which is fluid at ordinary room temperature and which is dried by any one of the methods above enumerated, the invention contemplates an ink which is naturally solid or hard at ordinary temperatures. Such an ink is applied at a somewhat elevated temperature, at which the ink is melted and has a workable consistency suitable for making the impression. After the stock has been printed and leaves the printing surface, the ink immediately cools to a temperature at which it solidifies and hardens.

Briefly described, the invention herein claimed comprises printing inks for letterpress, litho, and/or gravure printing consisting of a pigment or pigments, and/or dyes dispersed in solvent-free solids which will melt to printing consistency at elevated temperatures.

Broadly speaking, such inks may comprise, in addition to pigments, fusible solids of somewhat high solidification point and in addition thereto other materials which will tend toward a greater viscosity in the fused ink and a higher degree of solidity in the ink at ordinary temperatures. However, the solid is free from volatile solvents. The compositions of the inks of this invention vary from very simple formulae to those which are more complex. The following example illustrates the composition of a very simple ink of the kind described above:

*Example 1*

| | Parts |
|---|---|
| Carbon black | 10 |
| Gilsonite | 45 |
| Candelilla wax | 45 |

The wax is first melted and the carbon black may be thoroughly incorporated into the wax by use of suitable mixing and milling equipment, after which the gilsonite may be added in a steam jacketed mixer.

A more complex composition is illustrated by the following example:

*Example 2*

| | Parts |
|---|---|
| Gilsonite | 50 |
| Candelilla wax | 40 |
| Chrome orange | 6 |
| #3 litho varnish | 3 |
| Carbon black | 1 |

Blends of candelilla wax and gilsonite have the property of wetting and adhering to the fiber of the stock, of changing viscosity gradually above their melting point, passing through stages where the length and tack of the blend produce a suitable printing consistency, and of having so little surface tension that apparently they tend to flow out in a flat pool rather than cohering in a droplet, as does water on a waxy surface. These properties play an important part in providing the desired qualities of inks prepared according to the present invention. When solidified at normal temperatures, the surface of a print made from an ink consisting predominantly of these materials is dry and hard.

I have found that certain waxes, resins, pitches and equivalent substances have these properties in degree sufficiently pronounced to adapt them for use in accordance with the principles of the invention. In general, the inks consist of coloring pigments incorporated in solid thermo-fluid vehicles which contain not less than 40%, by weight, of hard thermo-plastic resin (of which hard resins such as the natural resin, gilsonite, and the artificial hydrocarbon resin, Santo resin, are examples), together with a minor proportion of hard waxy material (of which candelilla wax and ozokerite are examples). While neither resin nor wax, alone, possesses the requisite physical properties and consistency when molten for use as the ink vehicle, the new inks which utilize a combination of their properties have been found satisfactory. The following is an example of an ink having a synthetic resin incorporated therein:

*Example 3*

| | Parts |
|---|---|
| Synthetic petroleum resin (Santo resin) | 60 |
| Ozokerite | 20 |
| Peacock blue | 20 |

(Santo resin is an isobutylene polymer which melts completely at a temperature of about 104° C. It is available from the Monsanto Chemical Company.)

The amount of hard thermo-plastic resin in the ink of Example 3 is equivalent to about 75% of the weight of the solid vehicle, while in Example 2 the resin content is about 55.5%, and in Example 1, about 50%. The content of hard waxy material usually is not less than about 20%, being about 25% in Example 3, about 44.5% in Example 2 and about 50% in Example 1. In the preferred examples waxy material does not constitute more than about 45% of the vehicle.

The ink of Example 1 softens at about 64° C. The viscosity change at this temperature is very gradual. At 75° C. it has an ideal printing consistency.

The ink of the third example reacts similarly to the ink in Example 1, but the body of Example 3 is light colored, which permits the use of colors without affecting their brilliancy to any extent.

The inks of this invention are capable of being printed from various types of printing members, including plates made by the etching processes that are used by commercial printers. These inks, furthermore, do not require deeply etched cells; in fact it may be desirable in gravure printing to use shallower etchings. It can be said that the ink of this invention, therefore, is made to produce prints upon which the ink is of normal thickness. In letter-press work the thicknesses are less than .001 of an inch, while in gravure, .002 to .003 inch is the upper limit.

The inks of the present invention in general have melting points below the temperatures at which the stock printed upon will be injured, or at which the copper, zinc, or alloy printing plates soften, or at which the rubber and composition rollers will be deleteriously affected. Other properties and conditions which must be considered in selecting the particular ingredients with which inks may be compounded are as follows:

The ink on the printed sheet should not be liquid below 50° C. in order that it will remain fixed in a warm climate and when exposed to the sun on newsstands. The fusible solid used in such inks must not be of the type that will penetrate deeply in the fused state through the fibers of paper stock, but rather must be of the type that will adhere readily to the surface with a minimum of penetration of the fiber.

Most of the inks that I have used in my experiments have had a melting point of 50° to 70° C., but I do not wish to limit my invention to these temperatures, as it is conceivable that inks of higher or lower melting points will react in accordance with the principles of my invention, and may prove advantageous for certain properties or uses. Finished prints made with the inks above described, when subjected for periods as long as 18 hours at temperatures up to 82° C. remained unaffected. It is, therefore, not necessary to have the melting point higher than the highest temperature to which the finished print may be exposed in order to prevent deterioration of the print. Thus it is possible to make my type of ink with a melting point low enough to permit using it in the fused state without injury to delicate pigments, and still get the necessary solidifying properties on paper.

In my experience I also found it advantageous to use pigments ground or flushed in linseed oil as a means of introducing thoroughly dispersed pigments into a suitable solid of elevated melting point. These inks were satisfactory from the standpoint that they solidified sufficiently on cooling to permit handling and prevent offsetting.

It will be observed that an ink can be made with the following advantages according to the principles herein laid down. It may be made non-inflammable, non-toxic, and odorless; it will print solids smoothly; it can be made with a high pigment concentration so that when applied in an exceedingly thin film it will produce sharper detail and give greater coverage, color intensity, and brilliance; it has excellent lubricating qualities. It can be made to resist the chemical action of acid, alkalies, alcohol, etc., on the pigment due to the protection afforded by the solid dispersing medium. It does not spread and, therefore, prints sharply, has practically no strike-through and, due to its instantaneous drying, eliminates the troubles due to offset or smudging and eliminates the necessity of resorting to offset webs and slip-sheeting with all of their disadvantages. The print can be used or backed up immediately as it is completely dry immediately after being printed. It does not liver, skin, settle, or change with age, nor is it affected by climatic changes in the pressroom. Since no chemical change takes place in my ink from the liquid to the dry stage, ink that has solidified on the press is not lost but can be reclaimed readily.

My ink can be produced at moderate cost, can be packed and shipped economically and handled easily, will not leak out of containers, and is unaffected by transit, age, or climate.

For the purpose of applying this ink, the press is equipped with a suitable heating device to maintain the ink in a proper liquid condition during the printing operation. It may be desirable under some conditions to equip the press with suitable heating devices in order to heat the paper after being printed for a sufficient length of time to cause the ink further to flow or to spread to a smoother surface before solidifying. It may also be desirable to equip the press with a suitable heating device to heat the paper before printing in order to facilitate this flow. Such modifications of standard equipment will be readily visualized by persons skilled in the art, having in mind the characteristics of the particular ink desired to be used.

It will be noted that an important feature in the use of these inks lies in the fact that the temperature of the printing operation may be controlled to obtain the printing characteristics desired in the ink. The consistency and other printing qualities of the ink rest solely in temperature control, which renders one ink suitable for a wide range of purposes. By merely varying the temperature, the gloss and sharpness of the print can also be controlled without varying the formula.

What I claim is:

1. A normally solid printing ink for the commercial printing of publications, containers and other literature, which melts at a temperature above 50° C. and at elevated temperatures substantially above its melting point possesses a fluid consistency suitable for such printing by means of a suitably heated printing machine, said ink consisting of coloring material incorporated in a normally solid thermo-fluid vehicle and being substantially free from solvents volatile at said elevated temperatures, said vehicle comprising not less than 40% of hard thermo-plastic resin and a substantial proportion of hard waxy material.

2. A normally solid printing ink for the commercial printing of publications, containers and other literature, which melts when heated and at elevated temperatures above its melting point possesses a fluid consistency suitable for such printing by means of a suitably heated printing machine, said ink consisting of coloring material incorporated in a normally solid thermo-fluid vehicle and being substantially free from solvents volatile at said elevated temperatures, said vehicle comprising not less than 40% of hard thermo-plastic resin and from 20 to 45% of hard waxy material amounting to not less than about 20% of the solid.

3. A normally solid printing ink for the commercial printing of publications, containers and other literature, which melts at a temperature above 50° C. and at elevated temperatures substantially above its melting point possesses a fluid consistency suitable for such printing by means of a suitably heated printing machine, said ink comprising coloring pigment incorporated in a normally hard thermo-fluid solid and being free from solvents volatile at said elevated temperatures, said solid comprising predominantly hard thermo-plastic resin with most of the remainder hard waxy material.

4. A normally solid printing ink for the commercial printing of publications, containers and other literature, which melts at a temperature above 50° C. and at elevated temperatures substantially above its melting point possesses a fluid consistency suitable for such printing by means of a suitably heated printing machine, said ink comprising coloring pigment incorporated in a normally solid thermo-fluid vehicle and being substantially free from solvents volatile at said elevated temperatures, said vehicle comprising from 40 to 75% of hard thermo-plastic hydrocarbon resin and from 20 to 45% of hard wax.

5. A normally solid printing ink for the commercial printing of publications, containers and other literature comprising coloring pigment dispersed in a normally hard thermo-fluid solid, said solid consisting substantially entirely of gilsonite and candelilla wax in about equal parts by weight.

6. A normally solid printing ink for the commercial printing of publications, containers and other literature, comprising coloring pigment dispersed in a normally hard thermo-fluid solid, said solid consisting substantially entirely of gilsonite and candelilla wax in about equal proportions by weight and containing a small proportion of litho varnish.

7. A normally solid printing ink for the commercial printing of publications, containers and other literature, comprising coloring pigment incorporated in a thermo-fluid vehicle that is solid and hard at ordinary temperatures and nonvolatile at both ordinary and elevated temperatures, said vehicle containing not less than about 40% of hard thermo-plastic resin including a substantial amount of gilsonite and not less than about 20% of hard waxy material, said ink melting at a temperature above 50° C. and at elevated temperatures substantially above its melting point having a fluid consistency suitable for such printing by means of a suitably heated printing machine, said ink, when printed in thin films at said elevated temperatures onto relatively cold paper or the like, having the quality of setting instantly on the paper by freezing and of adhering permanently to the surface thereof in the form of smudge-resistant, opaque printed characters.

8. A normally solid printing ink for the commercial printing of publications, containers and other literature, which melts at a temperature above 50° C. and at elevated temperatures substantially above its melting point possesses a fluid consistency suitable for such printing by means of a suitably heated printing machine, said ink consisting of coloring material incorporated in a normally solid thermo-fluid vehicle and being substantially free from solvents volatile at said elevated temperatures, said vehicle comprising not less than 40% of hard thermo-plastic resin and not less than 20% of hard waxy material.

9. A normally solid printing ink for the commercial printing of publications, containers and other literature comprising coloring pigment incorporated in a thermo-fluid vehicle that is solid and hard at ordinary temperatures and nonvolatile at both ordinary and elevated temperatures, said vehicle containing not less than 40% by weight of hard thermo-plastic resin and a substantial proportion of hard waxy material, said ink melting at a temperature between 50° C. and 70° C. and at elevated temperatures above its melting point having a fluid consistency suitable for printing by means of a suitably heated printing machine, said ink, when printed in thin films at said elevated temperatures onto relatively cold paper or the like, having the quality of setting instantly on the paper by freezing and of adhering permanently to the surface thereof in the form of smudge-resistant, opaque printed characters.

10. A thermo-fluid printing ink for the commercial printing of publications, containers and other printed matter, comprising coloring material incorporated in a normally solid vehicle composed of substantially entirely of not less than 40% of hard thermo-plastic resin and not less than 20% of hard waxy material.

11. A normally solid printing ink suitable for the commercial printing of publications or the like when in a heated, molten condition comprising coloring material incorporated in a normally solid thermo-fluid vehicle containing not less than about 40% of hard thermo-plastic resin, a substantial proportion of hard waxy material and a substantial but small proportion of litho varnish.

WALTER HUBER.

CERTIFICATE OF CORRECTION.

Patent No. 2,268,593. January 6, 1942.

WALTER HUBER.

It is hereby certified that error appears in the printed specification of the above numbered patent requiring correction as follows: Page 3, second column, lines 43 and 44, claim 2, strike out "amounting to not less than about 20% of the solid" and insert the same after "material" in line 57, claim 3; and that the said Letters Patent should be read with this correction therein that the same may conform to the record of the case in the Patent Office.

Signed and sealed this 10th day of March, A. D. 1942.

(Seal)

Henry Van Arsdale,
Acting Commissioner of Patents.